United States Patent [19]

Lustig et al.

[11] 4,156,749

[45] May 29, 1979

[54] ELASTIC MULTILAYER PACKAGING FILM CONTAINING PLASTICIZED POLYVINYL CHLORIDE

[75] Inventors: Stanley Lustig, Park Forest; Stephen J. Vicik, Darien, both of Ill.

[73] Assignee: Union Carbide Corporation, New York, N.Y.

[21] Appl. No.: 870,599

[22] Filed: Jan. 18, 1978

[51] Int. Cl.² ............... B65D 25/06; B32B 27/08
[52] U.S. Cl. ................................ 428/35; 428/216; 428/518; 428/520; 426/129
[58] Field of Search .................. 428/216, 35, 518, 520

[56] References Cited

U.S. PATENT DOCUMENTS

| 3,741,253 | 6/1973 | Brax et al. ........................ 138/137 |
| 3,932,693 | 1/1976 | Shaw et al. ....................... 428/518 |
| 3,953,660 | 4/1976 | Ishida ............................... 428/518 |
| 4,057,667 | 11/1977 | Wiggins et al. .................. 428/518 |

*Primary Examiner*—P. C. Ives
*Attorney, Agent, or Firm*—David Fink

[57] ABSTRACT

An elastic multilayer film suitable for use in connection with the packaging of poultry, comprises a first outer layer including a plasticized polyvinyl chloride having an inherent viscosity greater than about 1.10 and having a plasticizer content of from about 35 phr to about 40 phr, and a second outer layer including an ethylene vinyl acetate copolymer having a vinyl acetate content of from about 16% to about 20% by weight and having a melt flow of from about 1.0 to about 3.0 decigrams per minute.

12 Claims, No Drawings

ELASTIC MULTILAYER PACKAGING FILM CONTAINING PLASTICIZED POLYVINYL CHLORIDE

The present invention relates to an elastic multilayer film, and more particularly to a two-layer film suitable for use in the packaging of poultry.

Generally, one of the typical commercial packaging operations of frozen poultry includes the following steps:
1. Enclosing boneless turkey meat in a string netting;
2. Enclosing the netted turkey meat in an elastic bag by mechanically expanding the bag to approximately 140% of its normal circumference, placing the netted turkey meat in the bag, and thereafter, allowing the bag to relax to its normal size to form a tight package;
3. Generally evacuating the air from the bag and clipping the end of the bag closed;
4. Quick freezing the bagged turkey meat to a temperature as low as about −40° C.; and
5. Shipping the frozen turkey meat in the bag.

A bag suitable for these steps must be formed from a film exhibiting good dimensional stability, production controllable thickness, non-tacky surfaces, and economical production. In addition, the film must have good resistance to abrasion and impact because the shipping of the bagged turkey meat usually results in the abrasion of bags against each other as well as their mutual impacts.

One prior art film used to fabricate bags for the turkey meat is a plasticized vinyl film. The bags formed from this film have the drawback that an unsatisfactory percentage of bags became damaged during the shipping step.

In accordance with the present invention, there is provided an elastic multilayer film suitable for use in connection with the packaging of poultry, comprising a first outer layer including a plasticized polyvinyl chloride having an inherent viscosity greater than about 1.10 and having a plasticizer content of from about 35 phr to about 40 phr, and a second outer layer including an ethylene vinyl acetate copolymer having a vinyl acetate content of from about 16% to about 20% by weight and having a melt flow of from about 1.0 to about 3.0 decigrams per minute. Preferably, the first outer layer has a thickness of from about 1.75 mils to about 2.0 mils and the second outer layer has a thickness of from about 0.5 mil to about 0.75 mil.

Preferably, the film consists of the two outer layers. In addition, a thickness of 0.75 mil for the second outer layer and vinyl acetate content of about 18% by weight are preferable.

Preferably, the plasticizer is at least 27 phr of a food approved plasticizer such as dibutyl sebacate or a di-n-hexyl azelate which are low temperature plasticizers. The remaining plasticizer is preferably an epoxidized soybean oil.

An ethylene vinyl acetate copolymer having a vinyl acetate content greater than about 20% by weight generally results in a film having insufficient strength. For a vinyl acetate content less than about 16% by weight, there is poor adhesion between the two outer layers.

An ethylene vinyl acetate copolymer having a melt flow less than about 1.0 decigram per minute is undesirable because of the difficulty in processing this type of resin at die temperatures preferably for plasticized polyvinyl chloride extrusion. A melt flow too high tends to weaken the puncture resistance of the film.

Generally, the processes of forming the film of the invention and bags can be carried out using conventional blown film extrusion processes.

Preferably, a two-layer film is coextruded into tubular form, air cooled to a temperature below the softening point, and then wound into rolls for subsequent fabrication into bags. It has been discovered that the temperatures of the elbow and die of the extrusion device are critical for obtaining satisfactory films according to the invention and these temperatures must be adjusted so that the temperature of the inside of the extruded tube of film and the temperature between the two layers is relatively cool. These temperatures are readily identifiable to persons in the art because the film leaving the extrusion device has a visual appearance of having a low gloss level. The preferred conditions correspond to a temperature of about 425° F. at the exit of the die.

Illustrative, non-limiting examples of the practice of the invention are set out below. Numerous other examples can readily be evolved in the light of the guiding principles and teachings contained herein. The examples given herein are intended mainly to illustrate the invention and not in any sense to limit the manner in which the invention can be practiced.

All percentages and parts stated herein are by weight unless otherwise stated.

As used herein, the term "phr" has the conventional meaning of parts per 100 parts of polymer.

The materials described herein have their properties determined in accordance with the following test methods:

Melt Flow—ASTM D-1238 -57T at 44 psi and 190° C.

Viscosity—ASTM D-1243

In the examples, the materials shown in Tables 1 and 2 were employed:

TABLE 1

| Ethylene Vinyl Acetate | Melt Flow dg/min. | Vinyl Acetate Weight Percent | Commercial Identification And Source |
|---|---|---|---|
| EVA A | 2.5 | 18 | DQDE-1868 Union Carbide Corp. |
| EVA B | 2.5 | 18 | EVA 3170 E.I. du Pont de Nemoirs |
| EVA C | 9.0 | 18 | EVA 3172 E.I. du Pont de Nemoirs |
| EVA D | 20 | 18 | EVA 4227 E.I. du Pont de Nemoirs |
| EVA E | 0.7 | 18 | EVA 3165 E.I. du Pont de Nemoirs |
| EVA F | 0.8 | 9½ | EVA 4210 E.I. du Pont de Nemoirs |

TABLE 2

| Polymer | Melt Flow dg/min. | Description | Commercial Identification and Source |
|---|---|---|---|
| EEA A | 5–7 | ethylene-ethyl acrylate; 18% ethyl acrylate | DPD-6169 Union Carbide Corp. |
| EEA B | 0.1 | ethylene-ethyl | |

TABLE 2-continued

| Polymer | Melt Flow dg/min. | Description | Commercial Identification and Source |
|---|---|---|---|
| Polyethylene C | 0.7 | acrylate; 2% ethyl acrylate polyethylene; density 0.961 g/cm$^3$ | DGDJ-6095 Union Carbide Corporation |
| Polybutylene D | 2.0 | polybutylene; density 0.91 g/cm$^3$ | Witron 1200 Witco Chemical Corp. |
| Polyurethane E | | polyurethane; density 1.20 g/cm$^3$ | Estane 5701 B.F. Goodrich Chemical Co. |
| Ionomer F | | 12% ethylene-methacrylic acid copolymer; 37% conversion to a zinc salt | Surlyn 1650 E. I. Du Pont de Nemoirs |
| EDMA | 1.5 | ethylene dimethylacrylamide, 14% amide | |

EXAMPLES 1 to 9

Two layer films were produced with a first outside layer of a plasticized polyvinyl chloride including 27.5 phr of dibutyl sebacate and 10.0 phr of epoxidized soybean oil, and a second outer layer of an ethylene vinyl acetate copolymer as shown in Table 3.

Generally, the extrusion equipment includes a 2½ inch 16:1 L/D NRM oil heated extruder to feed the plasticized polyvinyl chloride. The barrel temperature was maintained at about 300° F. and the screw speed was about 22 rpm. The ethylene vinyl acetate extruder was a 1¼ inch-18:1 L/D TEC extruder with the barrel temperature maintained at about 320° F. and a screw speed of about 34 rpm. A 60 mm diameter two layer die was used with the plasticized vinyl chloride as the inner layer and the ethylene vinyl acetate copolymer as the outer layer. The die base temperatures were maintained at about 425° F. while the exit temperature varied from about 425° F. to about 475° F. Conventional blown film methods were used to cool and flatten the bubble. The film speed was about 50 fpm.

For the examples 1 to 9, the EVA's A, B, C, D, and E were used as well as different layer thicknesses. Observations on the extrusion performance and layer adhesion are indicated in addition to various physical properties of the films. The TITE-WRAP test is a test especially relevant to the intended use of the film of the invention. The tubular film is cut to a length of about one foot long and podwered to reduce its coefficient of friction and placed on two sets of jaws which are connected to pneumatic cylinders. The jaws are rapidly opened so that the circumference of the film is increased by about 50%.

Although EVA's C and D showed acceptable results for the respective examples 5 and 7, the unsatisfactory results of the related examples 6 and 8 indicate that the layer thicknesses suitable for commercial use might be unreliable. The EVA E presented problems in the extrusion because of the high viscosity, as indicated by the relatively low melt flow, is unsatisfactory at the temperatures suitable for vinyl extrusion.

The EVA's A and B showed satisfactory performance in the properties tested. Surprisingly, a film having a second outer layer about 0.5 mil in thickness was stronger than a film having a second outer layer about 1.0 mil in thickness.

EXAMPLES 10 to 17

Examples 10 to 17 were carried out with an endeavor to produce a film using conventional methods in order to compare the performance of additional polymers for the second outer layer. The first outer layer was the same as the example 1.

Table 4 shows the results of the examples 10 to 17. None of these examples produced a film satisfactory for commercially packaging poultry.

EXAMPLES 18 to 21

Examples 18 to 21 were carried out to demonstrate the necessity of maintaining the extrusion conditions relatively cool.

The example 18 is a known single layer plasticized vinyl used for packaging poultry. The examples 19 to 21 are films of the inventions with the dimensions shown and comprising the materials of the example 1. Also shown in the Table 5 are the extrusion conditions for the films and the breakage during packaging and shipping of bags fabricated from the films.

Table 3

| Example | Layer Thickness First/Second mil/mil | First Layer Polymer | Tensile Strength MD/TD psi/psi | Elongation MD/TD %/% | Impact Strength at 0° F./40° F./ Rm. Temp. in-lbs./mil | % of Breakage for TITE-WRAP at 50% Stretch 40° F. | Extrusion Performance | Layer Adhesion |
|---|---|---|---|---|---|---|---|---|
| 1 | 1.5/0.5 | EVA A | 3300/2700 | 280/290 | 33/38/33 | 0 | good | satisfactory |
| 2 | 1.0/1.0 | EVA A | 2500/2100 | 245/250 | 15/28/26 | 0 | good | satisfactory |
| 3 | 1.5/0.5 | EVA B | 3300/2900 | 260/300 | 31/38/40 | 0 | good | satisfactory |
| 4 | 1.0/1.0 | EVA B | 2500/2100 | 250/270 | 22/27/33 | 0 | satisfactory | satisfactory |
| 5 | 1.5/0.5 | EVA C | 3600/2900 | 280/305 | 38/38/40 | 0 | good | satisfactory |
| 6 | 1.0/1.0 | EVA C | 2500/2300 | 275/270 | 14/29/34 | 40 | unsatisfactory | satisfactory |
| 7 | 1.5/0.5 | EVA D | 3600/2900 | 290/310 | 35/36/42 | 0 | good | satisfactory |
| 8 | 1.0/1.0 | EVA D | 2500/2000 | 270/250 | 11/25/26 | 40 | unsatisfactory | satisfactory |
| 9 | 1.0/1.0 | EVA E | 2600/2400 | 280/290 | 27/33/29 | 0 | unsatisfactory | satisfactory |

Table 4

| Example | Layer Thickness First/Second mil/mil | First Layer Polymer | Tensile Strength MD/TD psi/psi | Elongation MD/TD %/% | Impact Strength at 0° F./at 50° F./Rm. Temp. in-lbs./mil | Extrusion Performance | Layer Adhesion |
|---|---|---|---|---|---|---|---|
| 10 | 1.5/0.5 | EEA A | 3200/2700 | 300/330 | 17/39/43 | weld line in film | unsatisfactory |
| 11 | 1.0/1.0 | EVA F | 2700/2400 | 310/320 | 17/28/34 | good | unsatisfactory |
| 12 | 1.0/1.0 | EEA B | 2800/2100 | 300/300 | 12/29/32 | good | unsatisfactory |
| 13 | 1.0/1.0 | Polybutylene D | material too tacky | | | | |
| 14 | 1.0/1.0 | EDMA | 2700/2300 | 290/300 | 16/30/31 | heavy weld line in film | satisfactory |
| 15 | 1.0/1.0 | Polyethylene C | 2600/2400 | 315/300 | 1.5/14/31 | poor edges and holes | unsatisfactory |
| 16 | 1.0/1.0 | Polyurethane E | material too tacky | | | | |
| 17 | 1.0/1.0 | Ionomer F | material too tacky | | | | |

Table 5

| Example | Film Layer Thicknesses First/Second mil/mil | Extrusion Conditions | Total % Breakage During Packaging and Shipping |
|---|---|---|---|
| 18 | Single Layer 1.75 mils | normal | 33.5 |
| 19 | 1.5/0.5 | hot | 61.2 |
| 20 | 1.75/0.75 | cold | 11.0 |
| 21 | 2.0/0.75 | cold | 5.5 |

The Table 5 shows the superior performance of the film according to the invention and the importance of the extrusion temperature on bag performance.

EXAMPLES 22 to 40

Example 22 is a conventional single layer film of plasticized vinyl and examples 23 to 40 are films with the materials of the example 1 prepared under various conditions and different layer thicknesses as shown in Table 6.

Generally, the temperatures of the inside of the tubular film and between the layers can be estimated by a person having ordinary skill in the art by visual appearance (gloss) on the film. Temperatures at the exit of the die which are broadly referred to as "cold", "warm", and "hot" correspond respectively to about 425° F., about 450° F., and about 475° F.

The single layer film of the example 22 was included to provide a comparison to the prior art.

The Dynamic Tensile test includes cycling a sample to a 50 inches per minute jaw speed from 0 to 200% elongation at about −40° F. and recording the average number of cycles to failure.

The film condition was visually determined based on the gloss of the film.

TABLE 6

| Example | Special Conditions | Layer Thicknesses First/Second mil/mil | Film Condition Inside/Between Tube/Layers | Dynamic Tensile at −40° F. Cycles to Failure | Impact Strength in-lbs/mil |
|---|---|---|---|---|---|
| 22 | Single layer | 1.75 | Cold | 4–6 | 14.6 |
| 23 | Normal | 1.5/0.5 | Hot/Cold | 2.5–4 | 26.4 |
| 24 | Hot elbow | 1.75/0.5 | Warm/Warm | 7.0 | 12.1 |
| 25 | Normal | 1.75/0.5 | Hot/Warm | 6.6 | 14.2 |
| 26 | Normal | 1.75/0.5 | Warm/Cold | 9.3 | 8.6 |
| 27 | Cold elbow | 1.75/0.5 | Warm/Cold | no failure after 10 | 14.8 |
| 28 | Normal | 1.75/0.5 | Hot/Cold | 6.0 | 11.9 |
| 29 | Normal | 1.5/0.5 | Warm/Cold | 8.0 | 30.9 |
| 30 | Cold elbow | 1.75/0.5 | Warm/Cold | 7.6 | 21.3 |
| 31 | Normal | 2.0/0.5 | Warm/Cold | 7.6 | 28.5 |
| 32 | Normal | 2.0/0.75 | Warm/Cold | 2.6 | 30.9 |
| 33 | Normal | 1.75/0.75 | Warm/Cold | 1.0 | 26.1 |
| 34 | Aux. die heater | 1.75/0.75 | Warm/Cold | 2.0 | 11.0 |
| 35 | Aux. die heater plus hot pipe | 1.75/0.75 | Hot/Warm | 4.0 | 13.6 |
| 36 | Normal | 1.5/0.75 | Cold/Cold | 7.0 | 8.3 |
| 37 | Normal | 1.75/0.75 | Cold/Cold | no failure after 10 | 18.8 |
| 38 | Normal | 2.0/0.75 | Cold/Cold | no failure after 10 | 39.8 |
| 39 | Normal | 2.0/0.75 | Cold/Cold | 7.6 | 59.9 |
| 40 | Normal | 1.75/0.75 | Cold/Cold | no failure after 10 | 48.2 |

The plasticized polyvinyl chloride in the examples 23 to 38 was the same as in the previous examples. In the examples 39 and 40, the plasticizer was 30 phr dibutyl sebacate.

The examples 24 to 28 show that reducing the temperature of the extrusion system provides an improved tensile strength.

The examples 29 to 35 generally were run at relatively cool extrusion temperatures and provide a comparison between films having layers of different thicknesses. While the impact strength of each of the examples 32 and 33 was high, the dynamic tensile strength for each was low.

For the examples 36 to 40, the thickness of the first outer layer was varied along with the amount of plasticizer. These examples provided the best results for both the dynamic tensile and the impact strength tests.

We wish it understood that we do not desire to be limited to the exact details shown and described, for obvious modifications will occur to a person skilled in the art.

Having described the invention, what we claim as new and desire to be secured by Letters Patent is as follows:

1. An elastic multilayer film adapted for packaging of poultry, consisting essentially of a first outer layer including a plasticized polyvinyl chloride having an inherent viscosity greater than about 1.10 and having a plasticizer content of from about 35 phr to about 40 phr; and a second outer layer including an ethylene vinyl acetate copolymer having a vinyl acetate content of from about 16% to about 20% by weight and having a melt flow of from about 1.0 to about 3.0 decigrams per minute.

2. The film of claim 1, wherein the vinyl acetate is about 18% by weight.

3. The film of claim 1, wherein said layers are in physical contact with each other.

4. The film of claim 1, wherein said second outer layer has a thickness of about 0.75 mil.

5. The film of claim 4, wherein the vinyl acetate is about 18% by weight.

6. The film of claim 1, wherein said plasticizer includes dibutyl sebacate.

7. The film of claim 1, wherein said dibutyl sebacate is at least about 27 phr.

8. The film of claim 7, wherein said plasticizer further includes epoxidized soybean oil.

9. The film of claim 1, wherein said plasticizer includes di-n-hexyl azelate.

10. The film of claim 1, wherein said melt flow is about 1.0 decigram per minute.

11. The film of claim 1, wherein said first outer layer has a thickness of from about 1.75 mils to about 2.0 units and said second outer layer has a thickness of from about 0.5 mil to about 0.75 mil.

12. A bag fabricated from the film of claim 1.

UNITED STATES PATENT AND TRADEMARK OFFICE
CERTIFICATE OF CORRECTION

PATENT NO. : 4,156,749
DATED : May 29, 1979
INVENTOR(S) : Stanley Lustig
Stephen J. Vicik It is certified that error appears in the above-identified patent and that said Letters Patent are hereby corrected as shown below:

Column 4, line 6, change "podwered" to --powdered--.

Signed and Sealed this

Eighth Day of January 1980

[SEAL]

Attest:

SIDNEY A. DIAMOND

Attesting Officer

Commissioner of Patents and Trademarks